Nov. 12, 1940.                A. J. A. PETERSON ET AL                2,221,604
                                   CONTROL SYSTEM
                                 Filed Jan. 24, 1940
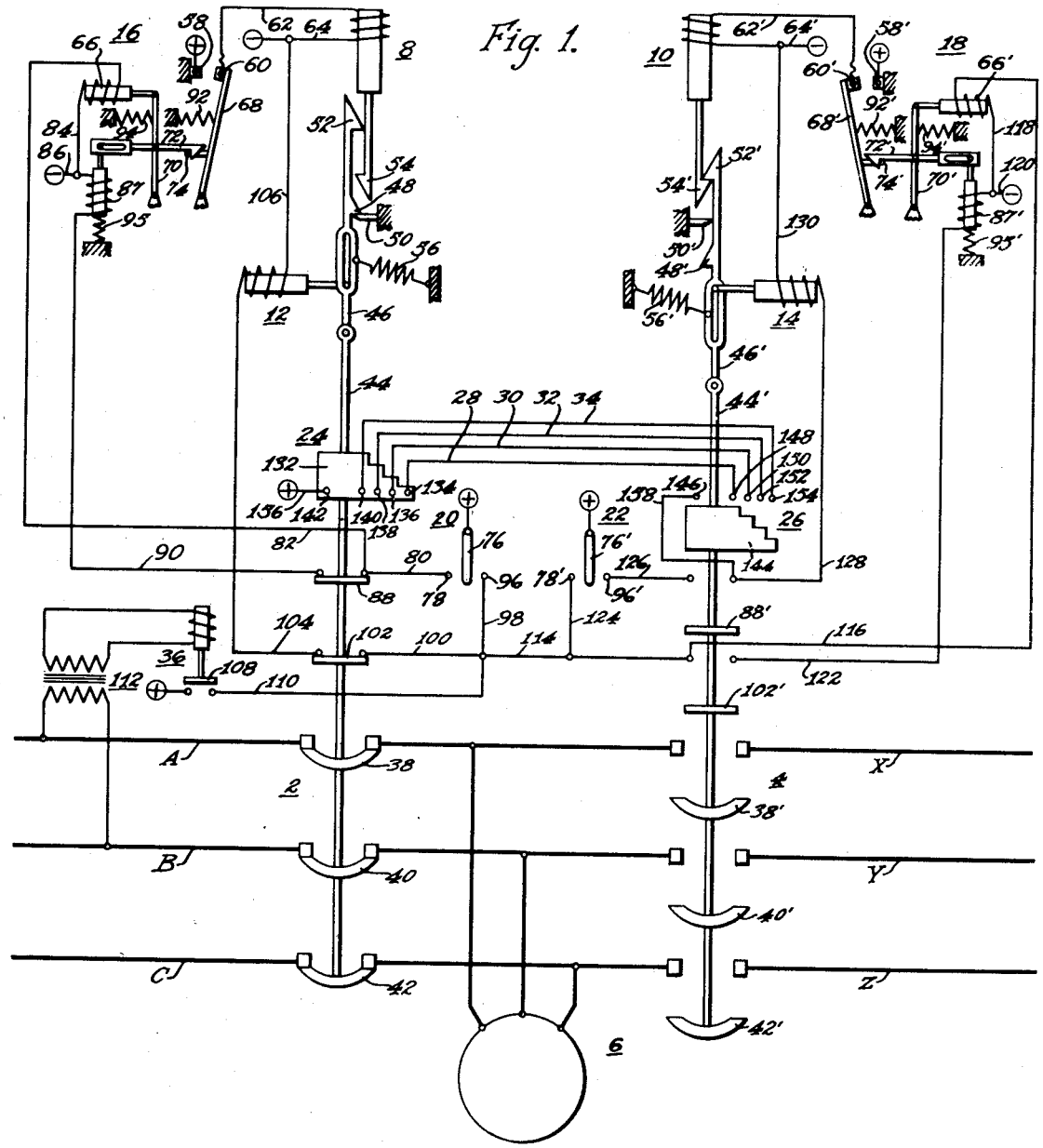
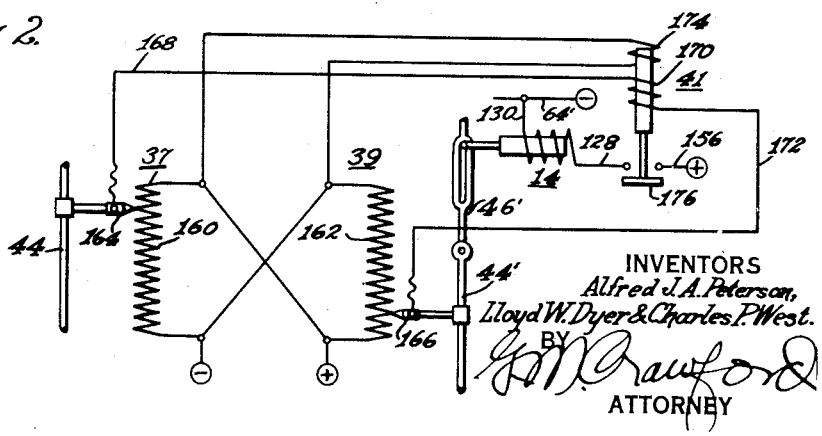
WITNESSES:
E. F. Oberheim.
Joe Weber
INVENTORS
Alfred J. A. Peterson,
Lloyd W. Dyer & Charles P. West.
BY
ATTORNEY Patented Nov. 12, 1940

2,221,604

UNITED STATES PATENT OFFICE 2,221,604

CONTROL SYSTEM

Alfred J. A. Peterson and Lloyd W. Dyer, Wilkinsburg, and Charles P. West, Forest Hills, Pa., assignors to Westinghouse Electric & Manufacturing Company, East Pittsburgh, Pa., a corporation of Pennsylvania Application January 24, 1940, Serial No. 315,360

19 Claims. (Cl. 171—97)

Our invention relates, generally, to control systems, and, more particularly, to systems providing an electrical interlock between associated circuit breakers or other relatively movable devices.

In the operation of synchronous motors and some other types of electrical machines, it is often necessary that the motor or other machine be transferred from one source of power or current supply to another and that this transfer be effected without connecting the two sources of power or supply together and with the shortest possible period of deenergization of the machine. The practice of closing a circuit breaker connecting the machine to one source of power after the breaker connecting the machine to the other source of power has opened necessitates a deenergization period at least equal to the closing time of the closing breaker.

Mechanical means have been provided heretofore for so interlocking two such circuit breakers as to move one toward closed position while the other is moving toward open position so that the one will close just as the other reaches full open position.

The object of our invention, generally stated, is to provide an electrical control system for controlling the operation of a plurality of relatively movable devices which shall function to provide predetermined coordinated movements of the devices by arresting the movement of one in the event that the motion of the other is stopped or retarded a predetermined amount.

Another object of our invention is to provide an electrical control system for a pair of associated circuit breakers which shall function to open one of the breakers while closing the other breaker with a minimum period of deenergization of a device energized through the breakers.

A further object of the invention is to provide an electrical interlocking control system for a pair of circuit breakers which shall function to energize an electrically operated device from two different sources of power and which shall function to cause the circuit breakers to change the energization of the device from one source of power to the other with a minimum period of deenergization of the device while preventing connection of both of the sources of power to the device simultaneously.

Another object of the invention is to provide an electrical interlocking control system for a plurality of circuit breakers which shall be inexpensive to manufacture, install, operate, and maintain.

These and other objects and advantages of the invention will be apparent from the following detailed description taken in connection with the accompanying drawing in which:

Figure 1 is a diagrammatic view of a control system embodying the principal features of a preferred embodiment of the invention, and Figure 2 is a diagrammatic view of a portion of another embodiment of the invention.

Similar reference characters are employed to indicate identical or corresponding parts of the two figures of the drawing and of the parts of each figure of the drawing.

In practicing our invention we provide circuit breakers 2 and 4 operable to connect a motor 6 or other electrically operated machine 6 to power buses represented by conductors A, B, and C and X, Y, and Z, respectively.

The circuit breakers 2 and 4 are provided with suitable closing means in the form of solenoids 8 and 10, respectively, and mechanically trip-free operating devices actuated by tripping solenoids 12 and 14, respectively. The circuit breaker closing solenoids 8 and 10 are controlled by control relays 16 and 18, respectively. The tripping solenoids 12 and 14 and the control relays 16 and 18 are controlled by selective control switches 20 and 22 through a control system which functions to simultaneously trip the breaker 2 and energize the closing solenoid of the breaker 4.

Auxiliary control switches 24 and 26 are interconnected by a plurality of conductors 28, 30, 32, and 34 and are actuated by the circuit breakers 2 and 4, respectively, and function to energize the tripping solenoid 14 to prevent the breaker 4 from closing in the event that the breaker 2 fails to open, delays its opening, or sticks while opening, so that the breaker 4 will not connect the machine 6 to the power bus represented by conductors X, Y, Z while the breaker 2 is either closed to the power bus represented by the conductors A, B and C or only partially opened.

A no-voltage relay 36 is provided for automatically transferring the machine 6 from the A—B—C bus which is the preferred power to the X—Y—Z bus.

The embodiment of the control system shown in Fig. 2 comprises associated potentiometers 37 and 39 connected in a bridge circuit and actuated by the motion of the circuit breakers and a sensitive polarized relay 41 responsive to a predetermined unbalance caused by the stopping or reduced speed of opening of the circuit breaker 2 to actuate the tripping solenoid 14.

Considering the control system more in detail the circuit breaker 2 comprises the usual main contact elements 38, 40 and 42 mounted for operation by a rod 44 on which there is pivotally mounted a latch bar 46. A detent 48 mounted on the latch bar 46 cooperates with a fixed detent 50 to hold the circuit breaker in the closed position as shown. A detent 52 on the latch bar 46 cooperates with a detent 54 operated by the closing solenoid 8 to move the circuit breaker to closed circuit position when the solenoid 8 is energized. The latch bar 46 is biased to latching position by a spring member 56.

The energization of the closing solenoid 8 is controlled by the contact elements 58 and 60 of the control relay 16 which complete a circuit for the solenoid extending from the positive terminal of any suitable source of energy, as indicated, through the contact elements 58 and 60, the conductor 62, the winding of the solenoid 8 and the conductor 64 to the negative terminal of the source of energy. The electromagnet 66 of the relay 16 actuates the pivoted bar 68 upon which a contact element 60 is mounted in cooperative relation with a stationary contact element 58 through a pivoted bar 70 on which is pivotally mounted a detent 72 which cooperates with a detent 74 on the bar 68.

The electromagnet 66 may be energized to close the contact elements 58 and 60 to thus energize the circuit breaker closing solenoid 8 by moving the contact element 76 of the control switch 20 to the left-hand position into engagement with the contact element 78. This energizing circuit extends from the positive terminal of the source of electrical energy through contacts 76 and 78, conductors 80 and 82 to winding of the electromagnet 66 and conductors 84 and 86 to the negative terminal of the source of energy.

After the circuit breaker 2 has moved to closed circuit position, a release magnet 87 of the control relay 16 will be energized through a circuit which is completed by a front contact element 88 actuated by the circuit breaker which extends from the positive terminal of the source of energy through the contact elements 76 and 78, conductor 80, contact element 88, conductor 90, the winding of the release magnet 87 and conductor 86 to the negative terminal of the source of energy. The energization of the release magnet 87 will release the pivoted detent 72 from the detent 74 and permit the contact element 60 to be disengaged from the contact element 58 by a spring element 92, thus deenergizing the closing solenoid 8.

When the contact element 76 of the control switch 20 is moved to the neutral position shown in the drawing, the release magnet 87 and the electromagnet 66 will be deenergized to permit the detent 72 to be moved to engagement with the detent 74 by the spring elements 94 and 95.

The tripping solenoid 12 is energized by engagement of the contact element 76 with a contact element 96 of the control switch 20 through a circuit which extends from the positive terminal of the source of energy through the contact elements 76 and 96, conductors 98 and 100, front contact element 102 of the circuit breaker 2, conductor 104, the winding of the tripping solenoid 12 and conductors 106 and 64 to the negative terminal of the source of energy. This energization of the tripping solenoid 12 will cause pivotal movement of the bar 46 to disengage the detent 48 from the detent 50 to permit the circuit breaker contacts to move to open circuit position.

The circuit of the tripping solenoid 12 may also be closed by the contact element 108 of the no-voltage relay 36 through a circuit which extends from the positive terminal of the source of energy through the contact element 108, conductors 110 and 100, contact element 102, conductor 104 through winding of the tripping solenoid 12 and conductors 106 and 64 to the negative terminal of the source of energy. The no-voltage relay 36 is connected to be energized in the circuit of a secondary of a transformer 112 whose primary is connected to the bus conductors A and B.

The circuit breaker 4 has substantially the same arrangement of contact elements, operating rod, latch bar, closing and tripping solenoids and control relay and the like parts of these elements are designated by similar reference characters in the drawing. The electromagnet 66' of the control relay 18, however, is connected to be energized by the movement of the contact element 76 of the control switch 20 to tripping circuit position in engagement with the contact element 96. The circuit for the electromagnet 66' extends from the positive terminal of the source of energy to the contact elements 76 and 96, conductors 98, 114 and 116, the winding of the electromagnet 66' and conductors 118 and 120 to the negative terminal of the source of energy. Thus the closing solenoid 10 of the circuit breaker 4 will be energized at the same time that the tripping solenoid 12 of the circuit breaker 2 is energized.

When the contact element 102' of the circuit breaker 4 moves to closed circuit position, the release magnet 87' of the control relay 18 will be energized through a circuit which extends from the positive terminal of the source of energy to the contact elements 76 and 96, conductors 98 and 114, contact element 102', conductor 122, the winding of the release magnet 87' and conductor 120 to the negative terminal of the source of energy. The parts of the control relay 18 will be returned to normal position when the contact element 76 of the control switch 20 is again moved to the neutral position indicated in the drawing.

The function of controlling the hereinbefore described circuits to actuate the tripping solenoid 12 of the circuit breaker 2 and the closing solenoid 10 of the circuit breaker 4 simultaneously may also be performed by moving the contact element 76' of the control switch 22 to engagement with the contact element 78', thus providing a circuit extending from the positive terminal of the source of energy through the contact elements 76', 78' and conductor 124 to the conductor 114 which is in shunt circuit relation with the hereinbefore described control circuit, which extends from the positive terminal of the source of energy to the contact elements 76 and 96 and conductor 98 to the conductor 114.

The contact element 76' of the control switch 22 may be moved to the right-hand position to engage the contact element 96' to complete an energizing circuit for the tripping solenoid 14 of the circuit breaker 4, extending from the positive terminal of the source of energy to the contact element 76' and 96', conductor 126, contact element 88', conductor 128, the winding of the tripping solenoid 14 and conductors 130 and 68' to the negative terminal of the source of energy. Thus it will be seen that the circuit breaker 2 may be tripped and the closing solenoid of the circuit breaker 4 energized simultaneously by moving the contact element 76 of the control switch 20 to the right-hand position or by moving the contact element 76' of the control switch 22 to the left-hand position.

The auxiliary control switch 24 associated with the circuit breaker 2 comprises a movable contact element 132 actuable out of engagement with fixed elements 134, 136, 138 and 140 successively and contact element 142 as the circuit breaker 2 moves to open circuit position. The auxiliary control switch 26 comprises a contact element 144 actuable to engage the contact element 146 and successively engage the contact elements 148, 150, 152 and 154 as the circuit breaker 4 moves toward closed circuit position. The conductors 28, 30, 32 and 34 connect the contact elements 134, 136, 138 and 140 with the contact elements 148, 150, 152 and 154, respectively. Thus as the circuit breaker 2 opens, if the opening speed is such as to open each of the contacts of the auxiliary control switch 24 before its associated contact element of the auxiliary control switch 26 is closed, there will be no connections established between the movable contact elements 132 and 144. If, however, the speed of opening of the circuit breaker 2 is not such as to ensure opening of the circuit breaker 2 before closure of circuit breaker 4, one of the pairs of associated contacts and their connecting conductor will complete a circuit between the contact elements 132 and 144 which will energize the coil of the tripping solenoid 14 of the circuit breaker 4. This circuit extends from the positive terminal of the source of energy through the conductor 156, the contact element 142, contact element 132, the conductor of the group of conductors 28, 30, 32 and 34 whose associated contact elements engage the movable contact members 132 and 134, the contact element 144, contact element 146, conductors 158 and 128, the winding of the tripping solenoid 14 and conductors 130 and 64' to the negative terminal of the source of energy, thus tripping the contact elements 38', 40' and 42' of the circuit breaker 4 from the closing solenoid by disengagement of the detents 52' and 54' even though the closing solenoid 10 may still be energized and operating.

The embodiment of the invention shown in Fig. 2 comprises control means for the tripping solenoid 14 which may be substituted for the control switches 24 and 26 and their associated circuits in the embodiment of the invention shown in Fig. 1. Like reference characters indicate corresponding elements in the two figures of the drawing.

In the embodiment of Fig. 2, the potentiometers 37 and 39 comprise variable resistors 160 and 162, respectively, having contact elements 164 and 166, respectively, actuable by the circuit breaker operating rods 44 and 44', respectively. The resistors 160 and 162 are connected in parallel circuit relation and are energized from any suitable source of electrical energy indicated by the positive (+) and negative (−) signs. The movable contact elements 164 and 166 are interconnected in a circuit which extends from the contact element 164 through a conductor 168, a winding 170 of the polarized relay 41 and a conductor 172 to the contact element 166. Thus the potentiometers provide an equivalent Wheatstone bridge circuit in which the winding 170 of the polarized relay 41 is energized in accordance with the direction and degree of unbalance of the bridge.

The polarized relay 41 also has a continuously energized winding 174 and the relation of the windings 170 and 174 is such that the unbalance of the Wheatstone bridge circuit caused by the circuit breaker 2 stopping or slowing down in speed below the speed of closure of the circuit breaker 4 will cause the relay 41 to close its contact element 176. The contact element 176 controls the energizing circuit for the tripping solenoid 14 similar to the tripping solenoid circuit of the system of Fig. 1 with the contact element 176 substituted for the auxiliary switches 24 and 26 and their connecting circuits 28, 30, 32 and 34. This tripping circuit in Fig. 2 extends from the positive terminal of the source of energy through conductor 156, contact element 176, conductor 128, the winding of the tripping solenoid 14, and conductors 130 and 64' to the negative terminal of the source of energy.

Thus when the circuit breaker 2 fails to open, stops while it is opening, or fails to open at a speed having the desired relation to the speed of closure of the breaker 4, the relative movement of the contact elements 164 and 166 will be such as to unbalance the bridge circuit in such a direction as to cause the polarized relay 41 to close the tripping circuit of the breaker 4.

It is to be understood that the principle of our invention may be readily applied to numerous other simultaneously actuable devices the illustrated embodiments of the invention being applied to circuit breakers only as an illustrative example of the application of the principles of the invention. It will be seen that we have provided an electrical interlocking control system for a pair of circuit breakers, or the like, which shall function to energize an electrically operated device from two different sources of power, which shall function to cause the circuit breakers to change the energization of the devices from one source of power to the other with a minimum period of deenergization of the device while preventing connection of both of the sources of power to the device simultaneously, and which shall function to so control the operation of any plurality of simultaneously movable devices as to prevent certain of the devices from operating at too great a speed with respect to the speed of operation of the other devices.

In compliance with the requirements of the patent statutes, we have shown and described herein the preferred embodiments of our invention. It is to be understood, however, that the invention is not limited to the precise constructions shown and described, but is capable of modification by one skilled in the art, the embodiments herein shown and described being merely illustrative of the principles of our invention.

We claim as our invention:

1. In a control system for a pair of circuit breakers each disposed to connect an electrically operated device to a separate source of power, means for opening one of the breakers, means for operating the closing means of the other breaker, means for preventing the contacts of the said other breaker from closing, means for substantially simultaneously operating the opening means of the said one breaker and the closing means of the said other breaker, and means for operating said closure preventing means in the event that the said one breaker fails to open at a predetermined speed relative to the closing speed of the said other breaker.

2. In a control system for a pair of circuit breakers, means for opening one of the breakers, means for operating the closing means of the other breaker, means for preventing the contacts of the said other breaker from closing, means for substantially simultaneously operating the opening means of the said one breaker and the closing means of the said other breaker, and means responsive to the relative speeds of opening and closing of the said one and the said other breaker respectively for controlling said closure preventing means.

3. In a control system for a pair of circuit breakers, means for opening one of the breakers, means for operating the closing means of the other breaker, means for preventing the contacts of the said other breaker from closing, means for substantially simultaneously operating the opening means of the said one breaker and the closing means of the said other breaker, and means responsive to the relative speeds of opening closure of the said one and the said other breaker respectively for operating said closure preventing means in the event that the said one breaker fails to open at a predetermined speed relative to the closing speed of the said other breaker.

4. In a control system for a pair of circuit breakers one of which has a mechanical trip-free operating device and tripping means therefore, means for operating the closing means of the said one breaker, means for opening the other of the breakers, means for substantially simultaneously operating said closing means for the said one breaker and the opening means for the said other breaker, and means responsive to the relative speeds of closure and opening of the said one and the said other breaker respectively for controlling the tripping means for the trip-free operating device of the said one breaker.

5. In a control system for a pair of circuit breakers one of which has a trip-free operating device and tripping means therefor, means for operating the closing means of the said one breaker, means for opening the other of the breakers, means for substantially simultaneously operating said closing means for the said one breaker and the opening means for the said other breaker, and means for operating the said tripping means in the event that the said other breaker fails to open at a predetermined speed relative to the closing speed of the said one breaker.

6. In a control system for transferring an electrically operable device from one power supply to another without connecting the two supplies together during the transfer, a pair of circuit breakers each disposed to connect the device to a separate one of the power supplies, means for opening the first of said breakers, means for operating the closing means of the second of said breakers, means operable to prevent the contacts of said second breaker from closing regardless of the operation of the closing means, means for substantially simultaneously operating the opening means of said first breaker and the closing means of said second breaker, and means for operating said closure preventing means in the event that said first breaker fails to open at a predetermined speed relative to the closing speed of said second breaker.

7. In a control system for a pair of circuit breakers, means for opening a first one of the breakers, means for operating the closing means of the second one of the breakers, an electrically operable means for tripping the contacts of the second breaker free of the closing means thereof, means for substantially simultaneously operating the opening means of the first breaker and the closing means of the second breaker, and means responsive to the relative speeds of opening and closure of the first and second breakers respectively for controlling the energization of said electrically operable tripping means.

8. In a control system for a pair of circuit breakers, means for opening a first one of the breakers, means for operating the closing means of the second one of the breakers, an electrically operable means for tripping the contacts of the second breaker free of the closing means thereof, means for substantially simultaneously operating the opening means of the first breaker and the closing means of the second breaker, and means for energizing said electrically operable tripping means in the event that the first breaker fails to open at a predetermined speed relative to the closing speed of the second breaker.

9. In a control system for a pair of circuit breakers, means for opening a first one of the breakers, means for operating the closing means of the second one of the breakers, means for operating said opening and closing means substantially simultaneously, an electrically operable means for tripping the contacts of the second breaker free of the closing means thereof, an energizing circuit for said electrically operable tripping means including cooperating contact means operable by the opening of the first breaker and the closing of the second breaker for energizing said tripping means in the event that the first breaker fails to open at a predetermined speed relative to the closing speed of the second breaker.

10. In a control system for a pair of circuit breakers, means for opening a first one of the breakers, means for operating the closing means of the second one of the breakers, means for operating said opening and closing means substantially simultaneously, an electrically operable means for tripping the contacts of the second breaker free of the closing means thereof, and an energizing circuit for said electrically operable tripping means including first contact means actuated to open position by a predetermined movement of the first breaker toward open position and second contact means actuated to closed position by a predetermined movement of the second breaker toward closed position.

11. In a control system for a pair of circuit breakers, means for opening a first one of the breakers, means for operating the closing means of the second one of the breakers, means for operating said opening and closing means substantially simultaneously, an electrically operable means for tripping the contacts of the second breaker free of the closing means thereof, and an energizing circuit for said electrically operable tripping means including a first control means, a second control means, and means whereby said first and second breakers actuate said first and second control means respectively, said first control means comprising a plurality of fixed contact elements and a contact element movable by said first circuit breaker so disposed with respect to said fixed contact elements so as to move to open circuit position with respect to successive ones of said fixed contact elements as said first circuit breaker moves to open circuit position, said second control means comprising a plurality of fixed contact elements and a contact element movable by said second circuit breaker so disposed with respect to said fixed contact elements as to move to closed circuit position with respect to successive ones of said fixed contact elements as the second circuit breaker moves to closed circuit position, circuit means connecting successive ones of said fixed contact elements of said first control means with successive ones of said fixed contact elements of said second control means, whereby the energizing circuit for said electrically operable tripping means will be completed in the event that the opening movement of said first circuit breaker fails to move the successive contact elements of said first control means to open circuit position before the closing movement of said second circuit breaker moves the corresponding successive contact elements of said second control means to closed circuit position.

12. In a control system for a pair of circuit breakers, means for opening a first one of the breakers, means for operating the closing means of the second one of the breakers, means for operating said opening and closing means substantially simultaneously, an electrically operable means for tripping the contacts of the second breaker free of the closing means thereof, and an energizing circuit for said electrically operable tripping means including first and second control means operable by said first and second circuit breakers, respectively, a plurality of circuits extending between said first and second control means, means whereby the first control means opens successive ones of said circuits as it is operated by said first circuit breaker as it moves from closed to open position, means whereby the second control means closes successive ones of said circuits in the order of opening of said circuits by said first control means as it is operated by said second circuit breaker as it moves from open to closed position, whereby the energizing circuit for said electrically operable tripping means will be completed in the event that the opening movement of the first breaker fails to open the successive circuits before the closing movement of the second breaker closes the successive circuits.

13. In a control system for a pair of circuit breakers, means for opening a first one of the breakers, means for operating the closing means of the second one of the breakers, means for operating said opening and closing means substantially simultaneously, an electrically operable means for tripping the contacts of the second breaker free of the closing means thereof, and an energizing circuit for said electrically operable tripping means including first and second control means operable by said first and second circuit breakers respectively, a plurality of circuits extending between said first and second control means, means whereby one of said control means opens successive ones of said circuits as it is operated by said its associated breaker, and means whereby the other control means closes successive ones of said circuits in the order of opening by said one control means as it is operated by its associated circuit breaker, whereby the energizing circuit for said electrically operable tripping means will be completed in the event that the one control means fails to open the successive circuits before the other control means closes the successive circuits.

14. In a control system for a moving device, in combination, means for arresting the motion of the moving device, and means responsive to the relative motion of the device with respect to another device for controlling the said motion arresting means.

15. In a system for controlling the motion of a moving device, means for arresting the motion of the device, and means for automatically actuating said motion arresting means in the event that the motion of a second moving device is stopped before it reaches a predetermined point in its motion.

16. In a control system for a pair of movable devices, means for moving one of the devices, means for moving the other of the devices, means for arresting the motion of the said other device, and means for automatically actuating said motion arresting means in the event that the motion of the said one device is arrested or decreased in speed a predetermined amount.

17. In a control system for a pair of movable devices, means for moving one of the devices, means for moving the other of the devices, means for arresting the motion of the said other device, a potentiometer device actuated by the motion of said one device, a potentiometer device actuated by the motion of the said other device, and means responsive to the relative actuations of said potentiometers for actuating said motion arresting means, whereby the motion of the said second device will be arrested in the event that the motion of the said first device is stopped or fails to maintain a predetermined rate relative to the motion of the said second device.

18. In a control system for a pair of circuit breakers, means for opening a first one of the breakers, means for operating the closing means of the second one of the breakers, means for operating said opening and closing means substantially simultaneously, an electrically operable means for tripping the contacts of the second breaker free of the closing means thereof, a potentiometer operable by the opening motion of the said first breaker, a potentiometer operable by the closing motion of the said second breaker, and means responsive to the relative actuations of said potentiometers for energizing said tripping means, whereby the contacts of the said second breaker will be prevented from closing in the event that the motion of the said first breaker is stopped or fails to maintain a predetermined rate relative to the motion of the said second breaker.

19. In a control system for a pair of movable devices, means for moving one of the devices, means for moving the other of the devices, means for arresting the motion of the said other device, variable impedance means actuable by the motions of said movable devices, and means responsive to the relative actuations of said variable impedance means for actuating said motion arresting means, whereby the motion of the said second device will be arrested in the event that the motion of the said first device is stopped or fails to maintain a predetermined rate relative to the motion of the said second device.

ALFRED J. A. PETERSON.
LLOYD W. DYER.
CHARLES P. WEST.